United States Patent Office 2,907,720
Patented Oct. 6, 1959

2,907,720

CLEAR AND PIGMENTED MULTI-COMPONENT OIL-IN-WATER RESIN EMULSION TEXTILE DECORATING COMPOSITIONS AND PROCESS FOR PREPARING SAME

László Auer, South Orange, N.J., assignor to J. R. Geigy, S.A., Basel, Switzerland, a corporation of Switzerland No Drawing. Application July 23, 1956
Serial No. 599,318

15 Claims. (Cl. 260—6)

This is a continuation-in-part of my copending application Serial No. 436,691, filed June 14, 1954, now abandoned, for "Clear and Pigmented Oil-in-Water Resin Emulsions," as a division of my copending application Serial No. 196,724, filed November 20, 1950, for "Clear and Pigmented Oil-in-Water Resin Emulsions," now Patent No. 2,681,322, and is also a continuation-in-part of my copending application Serial No. 352,958, filed May 4, 1953, for "Improved Process in Making Oil-in-Water Resin Emulsion Pigment Printing Colors," now Patent No. 2,825,708.

GENERAL OUTLINE OF INVENTION

Textile printing and dyeing is conventionally done with dyestuffs, which are water soluble or are developed on the fibers from water soluble intermediates. The application of dyestuffs is a multistep process and frequently the ultimate color is not visible at the stage when the fabrics leave the printing or dyeing machinery. This causes difficulties in control and to avoid "seconds" needs great skill and lots of luck too.

Dyestuffs, in general, have more or less limited light fastness, particularly in light or pastel shades. The "Fade-o-meter" is an accepted apparatus to measure light fastness in an accelerated manner. Whereas automobile lacquers or resin finishes are required to be fast to Fade-o-meter exposure for 1000 hours, dyed fabrics or fabrics printed with dyes, fade in less than 48 hours, in most cases, and 10 to 20 hours' exposure fastness has to be accepted with many shades.

Pigments, in general, are more light fast than dyes, and therefore pigment printing and pigment dyeing has been the aim of the art since quite some time. As pigments are dry powders and insoluble in water or organic solvents, they have to be adhered to the fabric by a resinous binder. A particularly successful binder for pigments was found in the combination of oil modified alkyd resins and organic solvent soluble amino-aldehyde resins, such as butyl modified urea formaldehyde resins or butyl modified melamine formaldehyde resins. For printing, water-in-oil emulsion colors are used, whereas for solid color dyeing, it is customary to use oil-in-water emulsions. The "oil phase" of such emulsions consists of the binder resin, usually comprising an alkyd resin component and an amino-aldehyde resin component, in the presence or absence of organic solvents. The pigments may be incorporated either in the oil phase or the water phase.

The general drawback of pigment colors is their crocking. Crocking is marking off by abrasion onto an unprinted and not dyed portion of the fabric, or onto fabric in general. The crocking of pigment colors is their main drawback, which prevents increase in their use for coloring textiles. Also, the washability and dry cleaning resistance of pigment colored fabrics requires improvement, particularly if high temperatures of "curing" are to be avoided. Textile plants have low pressure steam available and for curing or thermosetting the amino-aldehyde resins temperatures of 275° to 300° F. are needed.

In present day textile printing with pigments water-in-oil emulsions are used in the trade, in spite of the fact that solvent cleaning of equipment is troublesome in textile plants.

Oil-in-water emulsions are easier to handle in textile plants than water-in-oil emulsions. They could be washed from the printing rollers, color boxes, doctor blades, brush rollers, etc. with water. They also could be washed from back-grays, rubber blankets with ease. There are two reasons why there was no oil-in-water type printing color on the market prior to the instant development: (1) emulsifying agents which are suitable to produce oil-in-water emulsions and the necessary protective colloids, which secure stability, both reduce the washability of pigment prints. Present day binders do not take such reduction successfully. (2) If the same quality of pigment color is dispersed in an oil-in-water emulsion color concentrate and in a water-in-oil color concentrate, and both are reduced in varying proportions with clear cut-back emulsions, the water-in-oil emulsion printing colors take more reduction to yield a certain shade, than oil-in-water emulsions. The reason is probably explained by the fact that most pigments are hydrophobic and organophilic, flush into the oil phase, and if the color bearing oil phase is the continuous phase of the emulsion, better mileage is obtained, pound for pound of color. As the pigment colors are the most expensive ingredient of printing emulsion colors, economic factors excluded up to now the use of oil-in-water emulsions for printing, whereas they are used regularly for pigment padding, to obtain solid shades.

In accordance with this invention, improvement is achieved in making oil-in-water emulsion pigment colors by using fatty acid ester resin binders which are emulsion polymerized or emulsion aggregated. The instant invention is a continuation-in-part of copending applications Serial Nos. 739,945, filed April 7, 1947, now Patent No. 2,530,370; 91,009, filed May 2, 1949, now Patent No. 2,637,621; 169,791, filed June 22, 1950, now Patent No. 2,637,711; and 180,700, filed August 21, 1950, now Patent No. 2,637,705. By the use of such resin binders advantages result in faster solidifying binders, increased toughness and better aging qualities of the prints obtained.

As binder resins the following may be mentioned as suitable: condensation products of bis-phenol and epichlorhydrin esterified with fatty acid esters. Organic solvent soluble urea and melamine formaldehyde resins may be present in the emulsions to further toughen the binder resins.

The emulsion polymerized or emulsion aggregated oil-in-water emulsions of fatty acid esters are described in my copending application Serial No. 739,945, now Patent No. 2,530,370, above referred to. To prepare such emulsions, the fatty acid esters are bodied to a relatively heavy viscosity and then emulsified. The dispersed phase of such emulsions is the fatty acid ester. The dispersed phase particles of such emulsions are then aggregated by employing hydrogen peroxide, or in other ways as described in said copending application. The degree of aggregation of the dispersed particles in situ is such as to render the emulsion highly sensitve to the action of air when spread in thin films and thereby provide for the formation of a coherent solid film immediately upon demulsification of the emulsion. Advantageously the pH value of the emulsion is retained within certain limits during the aggregation treatment. Improved results are obtained by the treated emulsions of this specification if the increase in oxygen content of the solidified fatty acid esters is kept low, when compared with the oxygen content of the same esters before emulsification and emulsion aggregation.

STARTING MATERIALS

Typical of the oils, the fatty acids of which may form the esters used in this process are as follows:

Tung oil
Oiticica oil
Dehydrated castor oil
Linseed oil
Perilla oil
Sunflower oil
Poppyseed oil
Soya bean oil
Walnut oil
Rapeseed oil
Pineseed oil
Olive oil
Corn oil
Cottonseed oil
Coconut oil
Babassu oil
Hydroxylated oils such as castor oil, etc.
Fish oils (train oils)

The following polyhydric alcohols are suitable for producing esters with the above fatty acids:

Glycerin
Pentaerythritol
Mannitol
Sorbitol
Alcohols formed by the condensation of bis-phenol and epichlorhydrin
Certain polyglycols, amongst others Particularly advantageous results were obtained with the condensation products of bis-phenol and epichlorhydrin, esterfied with fatty acids, such as dehydrated castor oil fatty acids or mixtures of the fatty acids of soyabean oil and oiticica oil. Such esters may be further modified by styrenating them.

The above described fatty acid esters may be toughened by the addition of organic solvent soluble amine aldehyde resins formed with urea or melamine or alkylated or etherified urea and melamine.

A few examples are given of commercially manufactured resins useful in the instant process:

Epichlorhydrin and bis-phenol condensation product (alcohol): Epon 1004. Dehydrated castor oil fatty acid ester of Epon 1004: Epitex 120.

Organic solvent soluble amino-aldehyde resins: Melmac 245-8, Melmac 248-8.

I found that in my process best results are obtained with polyhydric alcohol esters of acids of fatty oils, which esters contain in their acid component at least 50% acids of fatty oils and which fatty oil acids comprise fatty acids having at least two double bonds.

Any appropriate mixtures or combinations of members of the above described classes may be treated, as desired.

The better drying a fatty oil is, the more suitable it is for my present process. I found that at least some of the fatty acids present in my esters should preferably contain more than one double bond in the molecule. This includes esters of the drying oil fatty acids and of the semi-drying oil fatty acids. I also found that esters of fatty acids having conjugated double bonds more easily undergo my emulsion aggregation process, than fatty acids with isolated double bonds.

EMULSION AGGREGATION

The fatty acid esters are bodied to a suitable viscosity before emulsification, and my copending application Serial No. 739,945, now Patent No. 2,530,370, describes the "ammonia test" which is very suitable to determine satisfactory viscosity. The "sulfur test" described in the same specification is another suitable method.

The emulsion polymerization or emulsion aggregation process and its reaction conditions is described in detail in copending application Serial No. 739,945, now Patent No. 2,530,370. The aggregating agent is oxygen. I believe that the active agent of my process is an electrically charged oxygen particle. However, I have no definite proof of that supposition. As not any and all oxygen may act in my process as aggregating agent, I shall refer to the oxygen which is suitable in my process as "active oxygen" and I believe that the particles of this active oxygen are most probably electrically charged.

I can obtain my active oxygen in various ways. (1) I may use a peroxide, such as a metal peroxide of hydrogen peroxide, or organic peroxide to supply my active oxygen to my emulsions. (2) I may blow oxygen or an oxygen containing gas, such as air, through my emulsions. (3) I may use the oxygen which is present in the water phase of my emulsion as absorbed oxygen.

Application of heat accelerates the action of the oxygen. Usually temperatures between 50° C. and 80° C. are useful for such acceleration. Agitation of the emulsion also accelerates the process.

In case peroxides are used and oxygen is liberated in situ, further activation by agitation and/or heat is not a necessary requirement and the aggregation may be carried out in a satisfactory way at room temperature and even at temperatures lower than room temperature.

The concentration of the emulsion influences the rate of reaction. The 10% to 20% non-volatile containing emulsions will produce solidified particles faster than a 70% solid content emulsion. Very satisfactory results can be obtained around 50% non-volatile content.

Advantageous pH limits

One of the important criterions of my process is the pH of the emulsion. I found that it is important to have critical pH limits to carry out my process satisfactorily. I found that the reaction is extremely slow with a pH of 7 and there is a very slow range from about a pH of 5.7 to about 8.4. The range is very active below 5.7, such as for instance in the neighborhood of pH of 2.8 and also above 8.4, for instance in the region of pH of 10.5 and higher. In other words, the reaction is greatly accelerated by the pH values below 5.7 or above 8.4. However, for many purposes, if working on the alkaline side, I found it to be advantageous to have a pH of at least 10, and if working on the acid side, to have a pH which does not exceed 4.

It has been found that metallic driers accelerate the emulsion aggregation process particularly in such cases in which the aggregation is carried out in an alkaline medium. Therefore, if metallic driers are desired to be present in the fatty acid esters, it is of advantage to work on the alkaline side. However, if the absence of metallic driers is desired, a conversion in an emulsion on the acid side is more desirable. Further, it may be mentioned that conversion on the acid side is advantageous if a constant pH is desired. In case of emulsion aggregation on the alkaline side, the pH generally changes insofar as it gradually becomes lower.

In the illustrative examples of this specification, the process will be demonstrated on emulsions which are on the alkaline side of the pH range. This is meant to illustrate the process only and not to limit same.

Oxygen supplying agents

As mentioned further above, if other reaction conditions are proper, the oxygen content of the water, present in the emulsion, may be satisfactory.

Oxygen may be supplied to the emulsion in the form of oxygen gas or oxygen containing gases, such as air, by bubbling through the emulsion such gases or by introducing them by known means. Ozone may also be used.

To produce oxygen in situ peroxides or other per-compounds may be used. In most of the examples hydrogen peroxide is used to illustrate the addition of per-compounds. However, other peroxides may also be used, such as sodium peroxide, barium peroxide, magnesium peroxide, zinc peroxide, other metal peroxides, or organic peroxides, such as benzoyl peroxide, urea peroxide, etc. Examples of per-compounds are further perborates, percarbonates, persulfates, such as potassium, sodium and ammonium persulfates, perchlorates, pyrophosphate peroxides, ozonides, etc. The criterion of the usefulness of these agents is that they should supply oxygen in situ under the reaction conditions applied in my process and that the emulsion could be prepared in such a way that it should not break in their presence.

Oxygen content

In my process the oxygen content of the emulsified fatty acid esters increases very little, if any, during the emulsion aggregation process. The oxygen content increase is not more than 2.8% and advantageously not more than 1.5%. In most cases the oxygen content increase is less than ½%.

EMULSIFYING AGENTS

Great variety of emulsifying agents may be used in my process. A list of such emulsifying agents is given, for instance, under the title of Surface-Active Agents in the January 1943 issue of Industrial and Engineering Chemistry, on pages 126 to 130.

Soaps of fatty acids are for instance satisfactory emulsifying agents. A list of some others is given herewith:

| Trade Name | Manufacturer's Description |
| --- | --- |
| Duponol ME | Fatty alcohol sulphate, sodium salt. |
| Aerosol OT | Dioctyl ester of sodium sulphosuccinic acid. |
| Emulphor AG | Ethylene oxide fatty acid condensate (polyglycol ester of long chain fatty acid, oleic acid type). |
| Igepon | Sodium sulphonate of an oleic acid ester of an aliphatic compound, for instance, of the type of $C_{17}H_{33}CON-(CH_3)-C_2H_4SO_3Na$. |
| Triton 720 and 770 | Sodium salt of aryl alkyl poly ether sulphonate. |

I found that from the various emulsifying agents those types are most suitable, which are active both on the acid and on the alkaline side. The non-ionic emulsifying agents belong to that class, such as for instance, nonaethyleneglycolmonooleate, or the corresponding dioleate, or the corresponding monolaurate or dilaurate or monoricinoleate or diricinoleate. As will be seen, the fatty alcohol sulphates (for instance, Duponol ME) are also suitable for my process.

PIGMENT USED IN MAKING WATER DISPERSIONS

The organic pigments used herein are usually prepared by precipitation methods. They are all water insoluble. As starting material for this invention either a filter press cake or dry powder can be used. Carbon black, if used, is not made by precipitation method and is used as dry powder in the process.

The following groups of pigments exemplify, but do not limit the scope of the starting materials of this invention:

(1) Phthalocyanine pigments

Phthalocyanine blue, which is a copper or tin-copper phthalocyanine, is marketed under trade names of Monastral Fast Blue and as Heliogen Blue.

Phthalocyanine green, which is a chlorinated copper phthalocyanine color, is marketed under trade names of Monastral Fast Green, and as Heliogen Green.

(2) Insoluble azo pigments

Benzidine Yellows are couplings between dichlorobenzidine and acetoacetic arylides, such as the acetoaceticanilide, -ortho toluidide, -xylidide, -para chloro anilide and -ortho chloro anilide.

Benzidine orange is a coupling product of dichlorobenzidine with pyrazolone substitution products, such as methyl phenyl pyrazolone.

Hensa Yellows are acetoacetic arylide couplings with substituted anilines, like 4-chloro-2-nitroaniline, or orthonitroaniline, amongst others.

Insoluble Azo Reds are coupling products of the Naphthol AS type compounds of beta-ortho-naphthoic acid, such as Naphthol AS, Naphthol AS–OL, Naphthol AS–BS, Naphthol AS–D with fast color salts, such as 2,5 dichloroaniline, p-nitro-orthotoluidine, p-nitro-ortho-anisidine, amongest others. One example is the coupling product of Naphthol AS–ITR with ITR fast color salt: Fast Red Color Salt ITR.

Naphthol AS type couplings may yield also yellows and oranges of the insoluble azo pigment group. Aniline Black pigment can be listed here too.

Toluidine maroon and Dianisidine Blue and a brown pigment obtained by forming the copper salt of para-nitroaniline red are other examples.

A newer color is marketed as Monastral Fast Gold Green.

(3) Vat pigments

Vat pigments are of the indigoid or anthraquinone type. The indigoid type includes thioindigo derivatives and the anthraquinone type includes derivatives of Flavanthrone, Benzanthrone and complex structures made by condensing benzanthrone molecules.

Thioindigo Red B has Color Index No. 1207 and Schultz No. 912. For formulation, i.e. structural formula see pages 206 and 209 in Pratt: Chemistry and Physics of Organic Pigments, John Wiley & Sons, 1947.

Idanthrene Blue with Color Index No. 1106, Schultz No. 837 is an example of the anthraquinone type vat pigments.

Structural formulas of some vat pigments are listed on pages 429 to 435 in volume V of Mattiollo: Protective and Decorative Coatings, John Wiley & Sons, Inc., New York, 1946. They include Idanthrene Rubino RD, Indanthrene Orange RRTA, Idanthrene Golden Orange GA, Idanthrene Brown RA, Helio Fast Yellow 6GL, Indanthrene Brilliant Violet 3BA, Fast Violet 4RN, Indigo Blue, Indanthrene Navy Blue RA.

(4) Carbon blacks

Furnace Blacks, Channel Blacks, acetylene gas blacks and lamp blacks can also be dispersed by the instant process.

PIGMENT DISPERSING AGENTS

In the improved pigment dispersion method of this invention the following dispersing agents are preferred:

Fatty alcohol sulfates, such as sodium, ammonium or triethanolamine salts of sulfates of lauryl alcohol, cetyl alcohol, oleyl alcohol and their mixtures. These agents are known in the art to form emulsions and are used as detergents, but their use as pigment dispersing agents is believed to be novel.

Sulfates or hydroabietyl alcohol act similarly to fatty alcohol sulfates.

Examples of commercial products are Duponol ME, which is a dry powder form of sodium lauryl sulfate, manufactured by E. I. du Pont de Nemours & Co., and Duponol WA paste, which is a water paste of the same compound, containing 30% active ingredient and some inorganic salt impurities.

It was found that the action of fatty alcohol sulfates is greatly enhanced and improved by using as further additive a minor quantity of sodium alkyl naphthalene sulfonates, such as the isopropyl naphthalene sulfonate and the isobutyl naphthalene sulfonate. The former is marketed under the trade name of Nekal A by the General Dyestuff Corporation and the latter as Nekal DK by the same company.

Further improvement in degree of deflocculation of the pigment is obtained, by adding protective colloids to the water dispersion, such as casein and methylcellulose.

The proportion of surface active agent to pigment content is very important. The fatty alcohol sulfates may be added in proportions of 2 to 20% per 100 parts of dry pigment, but for complete deflocculation of the pigment at least 10% and preferably 15 to 20% are used. Higher proportions of fatty alcohol sulfate are permissible, but do not seem to produce further improvement, in deflocculation, to a degree to warrant such increase. Larger proportions may be used, however, to satisfy specialty purposes of incorporation into finished products or to satisfy machinery limitations.

The sodium alkyl sulfonates are added in proportions of ½% to 4% based on the pigment content, 2% being a preferred and satisfactory proportion.

If protective colloids are added, about 1% of dry casein is used, based on the dry pigment content and about 5% methyl cellulose low viscosity type, designated as 15 cps. type in the trade. Larger quantities of protective colloids can be added, but their action is distinct in the here given proportions. They help to complete deflocculation and keep the particles in suspension.

These improved pigment dispersions are particularly advantageous in coloring latex compositions for dipping or knife coating or roller coating applications, and for use in paper beater coloring applications, also wherein increased color values are obtainable.

I have found that some pigments require larger proportions than 20% surface active agent, and the required percentage may go up as high as 40%.

A further improvement of the pigment dispersion step of this invention consists in carrying out the deflocculation of the pigment at elevated temperature which ranges from above room temperature to below the boiling point of water, as for instance 90° C.

PROTECTIVE COLLOIDS

In the examples of this specification casein, methylcellulose and sodium carboxymethylcellulose are mentioned as suitable protective colloids. Others which may be used are: gum tragacanth, dextrin, starch solutions, sodium polyacrylate, sodium polymethacrylate, hydroxy ethylcellulose of the water soluble and alkali soluble types, locust bean gum, water soluble salts of the maleic adduct of styrene, etc. Alginates may be used also.

As far as protective colloids and emulsifying agents go, care should be exercised that anionic and non-ionic agents and systems may be mixed, and cationic agents and systems may be mixed with non-ionic agents and systems, but cationic and anionic agents or systems normally cause flocculation of the emulsion or of the pigments.

PROPORTIONS OF INGREDIENTS

The proportions of the ingredients of the compositions of this invention, may tolerate certain limits. The examples here below illustrate the process and do not necessarily limit same.

*Emulsifying agents.*—Normally 2 to 6% emulsifying agent is used, based on the dispersed phase. Occasionally larger proportions are of advantage and in some cases somewhat lower quantities may work. As will be seen in an example of the schematic type, 0.7% emulsifying agent is a typical example, based on the total pigmented resin emulsion. In the total pigment color composition of this invention, the emulsifying agent derived from the resin emulsion ranges from about 0.18% to about 2.16%.

*Protective colloids.*—Many protective colloids exert stabilizing properties in as low a proportion as ½% of the water phase. The examples here below contain about 4 to 7% of the concentrated emulsion. In the total pigment color composition of this invention, the protective colloid ranges from about 0.075% to 4.34%. These proportions do not include any protective colloid component present in the pigment dispersion. The textile printing colors of this invention are stable to the degree, that they take repeated freezing and re-thawing cycles, without damage.

*Resin content.*—The dispersed phase in many of the examples is close to 50%. If the dispersed phase consists of a resin in a 50% N.V. solution, the concentrated emulsion will contain about 25% resin. Depending on the fact, whether the resin is in solvent or solvent free, resin contents of 15% to 50% are possible in the binder emulsions of this invention. In the total pigment color composition of this invention, the resin binder content ranges from about 4.5% to about 31%.

*Pigment content.*—The pigment content in the color concentrates ranges from 7 to 22%, but it may be higher if fillers or extender pigments are present. There is some limitation as far as the water content of presscakes is concerned, when presscakes form the starting material for the pigments. More organic pigments are hydrophobic and presscakes come between 10% to 35% pigment content, depending on the nature of pigment and method of precipitation. However, if we start with dry pigments, we can regulate the water content, as pigment slurries, properly dispersed, may be obtained as high as with 70% pigment content, the rest being water and dispersing agents as described above. An example of this is a titanium dioxide dispersion in water. The composition of the pigment dispersion is described above under the heading "Pigment dispersing agents."

*Pigment to binder ratio.*—In the examples we have about 12 to 12½ parts of resin solids and additional protective colloid solids per 7 to 22 parts of pigment. With pigments which crock higher, larger binder proportions are required, whereas with pigments with low crocking properties, the binder quantity can be reduced.

The color concentrate compositions of the present invention are viscous by nature and are dilutable with clear extender print paste emulsions to form the desired strength of shade when used for textile printing.

*pH of emulsions.*—Great advantages can be obtained on acid side emulsion polymerization. E.g. emulsions with metal free or drier-free formulation, can be successfully emulsion polymerized on the acid side, at pH ranges of 2.8 to 5.

Many cation active emulsifying agents work better on the acid side. Also these require acid emulsion polymerization.

The illustrative examples here below illustrate the process on alkaline side type emulsions and emulsion polymerization. These examples should therefore be considered to illustrate the process and not to limit same.

ILLUSTRATIVE EXAMPLES

The here following examples will illustrate the process and products without limiting them. Emulsifying agents, pH of emulsions, type and percentage of protective colloids will be considered variable, within the described scope of this specification.

ILLUSTRATIVE EXAMPLES

*E-polyester binders*

The E-polyester binders of this invention consist of an alcohol component and a fatty acid component.

*Alcohol component of E-polyesters*

The alcohol component of the E-polyesters of this invention are resinous condensation products of epihalohydrins or dihydrins with polynuclear phenols, like

(p-HOC$_6$H$_4$)$_2$—CMe$_2$

Me being a methyl radical. The most common type of this group is represented by the condensation products of epichlorhydrin with bis-phenol. The following resinous alcohols can be prepared by such condensation:

| Resin No. | Combining Weight | Melting Point, ° C. |
| --- | --- | --- |
| 1 | 132 | 65–75 |
| 2 | 174 | 95–105 |
| 3 | 188 | 125–135 |

These products are substantially free of halogens and should be considered as ethylene oxide derivatives of polynuclear phenols, showing free hydroxy groups, which can enter into esterification reactions.

*Fatty acid component of E-polyesters*

The fatty acid components may be fatty acids of naturally occurring fats and fatty oils. Examples are: oleic acid, linoleic acid, linolenic acid, clupanodonic acid, dehydrated ricinoleic acid, eleostearic acid, natural mixtures of soyabean fatty acids, sunflower oil fatty acids, linseed oil fatty acids, dehydrated castor oil fatty acids, tung oil fatty acids, stearic acid, palmitic acid, lauric acid, tall oil acids, etc. Rosin may be used to replace part of the fatty acids. Normally these fatty acids have 12 to 24 carbon atoms in the molecule. Unsaturated fatty acids obtained from drying and semi-drying fatty oils are preferred for this invention, as they reach the "thermo-set" stage at room temperature or at low temperatures, not exceeding 220° F. at reasonable speed. Linseed oil fatty acids and dehydrated castor oil fatty acids are examples of products with merit in this process. Rosin acids may be present to replace part of the fatty acids. E.g. linseed oil fatty acids and rosin may be combined simultaneously with the alcohol component.

*Resinous E-polyesters*

The following examples are given for the preparation of the E-polyester binders, suitable in the instant process:

EXAMPLE 1

| | Pounds |
| --- | --- |
| Alcohol component resin #2, with combining weight of 174 | 1102 |
| Rosin, W.G. grade | 243 |
| Linseed oil fatty acids | 1230 |
| Petroleum aromatic solvent with boiling range from 318 to 400° F. and flash point of 100° F. | 680 |
| Mineral spirits | 681 |
| Total | 3936 |
| Loss of water of esterification | 205 |
| Yield | 3731 |

Heat to 480° F. alcohol component resin, fatty acids and rosin, hold for one hour, hold for proper viscosity when thinned. Preferably pass inert gas through reaction mass, during heating. Thin. The yield is 472 gallons, 7.90 lbs./gal., non-volatile content 65%, acid number 12, viscosity Z-Z$_2$, Gardner scale.

EXAMPLE 2

| | Pounds |
| --- | --- |
| Alcohol component resin #2, with combining weight of 174 | 2540 |
| Dehydrated castor oil fatty acids | 1695 |
| Xylol | 3435 |
| Total | 7670 |
| Loss of water of esterification | 400 |
| Yield | 7270 |

Esterification reaction starts at 350 to 400° F. Raise temperature from 400° F. to 500° F. in 1.5 to 2 hours, pass inert gas through reaction mixture, hold until acid number is 2. Thin. Yield is 898 gallons, non-volatile 55%, 8.10 lbs./gal., acid number 0.5 to 2, viscosity X to Z on Gardner scale. This resin is further reduced to 50% N.V. with xylol for use in the examples.

Both the resin of Example 1, and that of Example 2, can be made by the solvent process of esterification, in the presence of small amounts of solvent, while the solvent is refluxed and the condensed water separated before the refluxing condensed solvent is returned to the reaction mixture. Temperature curve has to be adjusted to yield the same constants of the end product.

EXAMPLE 3

42.15 parts of E-polyester resin of Example 2, 0.31 part of mixed naphthenate driers, 12.22 parts of 10% sodium lauryl sulfate solution in water, 20.65 parts of a 20% casein solution in water, containing antifouling agents, 5.48 parts of ammonium hydroxide solution prepared by mixing 1 part of concentrated ammonium hydroxide and 1 part of water, 10.54 parts of a 20% water solution of sodium carboxymethyl-cellulose, low viscosity type and 8.65 parts of water are made into an emulsion in the following manner: Add to the resin solution under agitation ⅔ of the sodium lauryl sulfate solution, mix the remaining ⅓, the water and the casein solution in a separate container and add them slowly to the resin solution containing mixture under agitation. Add the ammonium hydroxide solution and add finally the sodium carboxymethylcellulose solution. Homogenize. This emulsion is a suitable binder for color concentrates.

EXAMPLE 4

To a phthalocyanine green press cake, marketed under the trade name of Heliogen Green GV presscake, having 27.6% pigment content Duponol ME dry powder was added to yield 18% Duponol on the pigment content, and Nekal A dry powder was added to yield 2% addition on the pigment content. The press cake was mixed with a spatula by hand; after 5 minutes it became completely liquid. It has been found, that dry powder addition, which is attractive as it does not increase water content, yields very satisfactory results. However, the premixing represents some problem and knife pronged agitators are needed, such as pony mixer blades, to liquefy the press cake to a slurry. Propeller types, or other turbine type agitators, do not work well at this stage as they could not manage to break up the lumps of the press cake. The premix is then further dispersed by the aid of an Eppenbach homomixer, which is a high speed turbo mixer, having a narrow clearance between turbine and stator. It runs about 3,600 r.p.m. About 15 minutes is satisfactory, but occasionally up to 30 minutes may be used. A 5 H.P. motored mixer satisfactorily disperses a 500 lb. press cake quantity in a 55 to 60 gal. size drum. (Open head drum.) The active ingredient in Duponol ME dry powder is the same as that of Duponol WA paste, i.e., technical sodium lauryl sulfate.

The homomixed slurry is passed through a colloid mill, to complete dispersion and deflocculation. Pebble milling is also very satisfactory to complete pigment deflocculation and dispersion. 24 hours to 48 hours are satisfactory milling times.

EXAMPLE 5

59 parts of the binder emulsion of Example 3, 26.25 parts of the phthalocyanine pigment dispersion in water of Example 4, 2.9 parts of a 60% polychloroprene latex, 3.9 parts of pine oil and 7.95 parts of water are mixed and homogenized, to form a color concentrate. Other pigments may be used instead of the phthalocyanine blue, as described further above in Example 4.

EXAMPLE 6

Example 3 is repeated, but using E-polyester resin solution of Example 1, after same has been reduced with Mineral Spirits to 50% non-volatile content. The resulting product is suitable as binder for color concentrates, like the one described in Example 5.

*Emulsion polymerized resin binders*

If the resin binder is "emulsion polymerized" or emulsion aggregated as described in my copending application Serial No. 739,945, now Patent No. 2,530,370, to which this specification is a continuation-in-part, advantages result in faster solidifying binders, increased toughness and better aging qualities of the prints obtained.

EXAMPLE 7

An emulsion-aggregated binder is prepared from the E-polyester solution of Example 2, according to Example 3 by the following changes: deducting 3.58 parts of the water added, and adding 3.58 parts of a 30 volume percent hydrogen peroxide solution to the emulsion at the stage after the ammonium hydroxide solution was added, but before the sodium carboxymethyl-cellulose solution is added. The hydrogen peroxide is added in increments, while the emulsion is slowly agitated. The addition of the hydrogen peroxide may be carried out during a 2 to 12 hour period. The sodium carboxymethylcellulose solution is added, after the emulsion aggregation process is completed.

EXAMPLE 8

Example 7 is repeated with the change that the E-polyester solution of Example 1, is used, reduced to 50% N.V. with Mineral Spirits, instead of the solution of Example 2.

EXAMPLE 9

The product of Example 5 is repeated with the alteration that the binder emulsion is an emulsion aggregated mixture of 90% E-polyester resin solution of Example 2 and 10% of a butyl modified melamine formaldehyde resin, containing 50% N.V., 30% xylol and 20% butyl alcohol. A suitable product is Melmac 245–8. The presence of the melamine resin increases toughness of the film deposited as a print.

EXAMPLES 10 TO 13

Examples 10 to 13 show the preparation of clear extender print pastes suitable to adjust the color strength of the color concentrates of this invention. The color concentrates and the extender print pastes can be mixed in various proportions to yield cuts of varying color strength. Cuts from 1 to 1 up to 1:200 are normally used.

EXAMPLE 10

5.90 parts of the emulsion of Example 7, 47.05 parts of a 3% water solution of 4000 cps. methyl cellulose, 47.05 parts of water are mixed and homogenized. Under agitation with a suitable mixer, like the Eppenbach homomixer, 100 parts Mineral Spirits are stirred into the former emulsion in increments. The Mineral Spirits used in this example has a bulking value of 0.1515 gallon per pound, a flash point of 100° F., a kauri-butanol value of 44 to 46, and is marketed under the trade name of Amsco Mineral Spirits #46.

EXAMPLE 11

To make an extender print paste similar to Example 10, but where the volumetric relation of solvent to water phase is changed to yield a lower solvent percentage: 23.563 parts of a 3% methylcellulose solution in water, using 4000 cps. methylcellulose, 23.563 parts of water and 2.874 parts of concentrated resin emulsion of Example 7, are mixed and 45.710 parts of Mineral Spirits of Example 10 are incorporated in a manner as described in Example 10. The resulting emulsion has a somewhat lower viscosity than the product of Example 10. This extender emulsion has about 0.739% methylcellulose, 48.499% water, 47.739% of solvent and 3.003% reinforcing concentrated resin emulsion.

EXAMPLE 12—RESIN-FREE EXTENDER PASTE 0.750 part of 4000 cps. high viscosity methylcellulose is dissolved in 49.250 parts of water. 50 parts of Mineral Spirits of Example 10 is incorporated in increments under proper agitation. A viscous print paste is obtained.

EXAMPLE 13—EXTENDER PRINT PASTE OF EXAMPLE 10, WHERE ONE-HALF OF METHYL CELLULOSE IS REPLACED BY WATER 0.353 part of 4000 cps. high viscosity methylcellulose is dissolved in 46.773 parts of water, yielding an 0.75% methylcellulose solution. This is mixed with a concentrated oil-in-water resin emulsion of Example 7, taking 2.874 parts of the latter. The resulting product is agitated and 50 parts of Mineral Spirits of Example 10 are incorporated in increments under proper agitation. The 50% lower content in high viscosity methylcellulose, its water phase and consequently the emulsion has lower viscosity. The product is a fluid viscous emulsion with good printing qualities.

Other extender print pastes, suitable in this invention are described in my co-pending application Serial No. 180,700, now Patent No. 2,637,705. The concentrated resin emulsions in Examples 10, 11 and 13, and in the examples of my co-pending application Serial No. 180,700, may be replaced by other concentrated emulsions described elsewhere in this specification.

EXAMPLE 14—SCHEMATIC FORMULA FOR A CONCENTRATED RESIN EMULSION

In this example a schematic formula is given to prepare a concentrated resin emulsion suitable in this invention. Resin examples are also listed, which can be satisfactorily used in this schematic formula.

|  | Percent |
|---|---|
| Resin solution 50% N.V. | 41.84 |
| Driers, as below | 0.63 |
| Pine oil | 0.46 |
| 10% Duponol ME sol. in water | 12.11 |
| 20% casein sol. in water as below | 20.58 |
| Mixture of 50% conc. ammonia and 50% water | 5.40 |
| Low viscosity methylcellulose solution, as below | 15.44 |
| Hydrogen peroxide 30% | 3.54 |
| Total | 100.00 |
| Non-volatile content | 28–29 |

Drier mixture for schematic formula:

| Lead naphthenate | 24% metal content sol. 200 parts b.w. |
| Cobalt naphthenate | 6% metal content sol. 25 parts b.w. |
| Zinc naphthenate | 6% metal content sol. 30 parts b.w. |

Casein solution for schematic formula:

| Casein, dry | 7.75 parts b.w. (Protovac 8397). |
| Water | 31 parts b.w. |
| Dowicide A | 0.0775 part b.w. (1% on casein). |
| Dowicide O | 0.0775 part b.w. (1% on casein). |
| Ammonia, conc. | 0.1163 part b.w. (1.5% on casein). |

Low viscosity methylcellulose solution for schematic formula:

| Methylcellulose, 15 cps | 2.09 parts by wt. |
| Water | 13.35 parts by wt. |

Order of addition in suitable emulsifying equipment:
  (1) Resin solution, drier sol. pine oil mixed
  (2) Duponol solution added
  (3) Casein solution added
  (4) Ammonia solution added
  (5) Hydrogen peroxide added in increments
  (6) Methylcellulose solution added.

Methylcellulose solution may be present before hydrogen peroxide addition. If e.g. sodium carboxymethylcellulose (CMC) replaces methylcellulose it is preferable to add it after hydrogen peroxide addition.

Resins suitable for schematic formula are: Epitex 120, bis-phenol epichlorhydrin condensation product esterified with dehydrated castor oil fatty acids. Suitable similar resins can be made by esterifying the condensate (like Epon 1004) with a mixture of 90% soyabean oil fatty acids and 10% oiticica oil fatty acids and 15% oiticica oil fatty acids.

Solvents used in above resins are aromatic and/or aliphatic hydrocarbons.

10 to 20% of resin solution in the schematic example, may be replaced with amine-aldehyde resins, which contain 50% N.V. in solvent mixture of alcohols and hydrocarbons, e.g.:

Melmac 245-8, butyl modified melamine formaldehyde resin, 50% resin solids, in xylol-butanol solvent mixture;
Melmac 248-8, butyl modified melamine formaldehyde resin, 55% resin solids, in xylol-butanol solvent mixture;
Uformite MM55 butyl modified melamine formaldehyde resin, 50% resin solids in xylol-butanol (1:4) solvent mixture;
Uformite MX61 alkyl modified triazine resin 60% resin solids, in xylol-butanol (1:1) solvent mixture;
Uformite F240 alkyl modified urea formaldehyde resin 60% resin solids, in xylol-butanol (1:1.5) solvent mixture;
Beetle 216-8 alkyl modified urea formaldehyde resin 60% resin solids, in xylol-butanol solvent mixture.

The same emulsions with the resins described above, can be prepared without emulsion polymerization, using water instead of the hydrogen peroxide in the schematic formula. Such emulsions are similar in nature to the one described in Example 3. The films they form will have a shorter life and the film formation period will be longer, than compared with the emulsion polymerized product.

EXAMPLE 15—SCHEMATIC FORMULATION OF PIGMENT COLOR CONCENTRATES

In the schematic formula for pigment color concentrates I prefer to use 59 parts of concentrated resin emulsion of Example 14, 2.9 parts of polychloroprene latex, 60% nonvolatile, like neoprene 601 latex and pigments in proportions of 7-9% pigment content in the color concentrate. The pigments may be incorporated in a manner described in Example 5, using pigment dispersions in water similar to that of Example 4.

The following pigments may be used satisfactorily: Yellow: Benzidine Yellow; Orange: Benzidine Orange; Green: Phthalocyanine Green; Blue: Phthalocyanine Blue; or Indanthrene Blue; Maroon: Thioindigo Maroon; Red: various insoluble azo pigments of the Naphthol AS type couplings; or Thioindigo Reds and Pinks; Brown: various azo browns and vat browns; Greys and Blacks: Carbon Black, such as furnace blacks and channel blacks, gas blacks, bone black, vegetable black, various vat blacks and greys.

The 59 parts of concentrated emulsion contains about 12.3 parts of resin solids, 2.4 parts of casein, 1.2 parts of low viscosity methylcellulose, 0.7 part of emulsifying agent, and 0.09 part of driers.

In this schematic formula the binder to pigment ratio may be changed in a manner that the binder solids are reduced and the pigment solids increased. Color concentrates with pigment content up to 22% and concentrated resin emulsion content down to 30 to 40% may be suitable for many purposes.

The use of amine-aldehyde resins helps the formation of thermoset resin films and also assists insolubilization of the protective colloids.

EXAMPLE 16—PIGMENT PADDING

Because of the lightfastness of pigments and ease of their application, to obtain solid color effects, pigment padding is becoming more and more popular to replace dyeing. The oil-in-water emulsions of this invention are suitable for pigment padding. The color concentrates of Example 15 may be diluted with water to the desired color strength. If higher viscosity is required, a mixture of the color concentrate and some extender clear printing paste may be diluted with water. In some cases it is advantageous to add water soluble protective colloids to increase the viscosity of the padding solution. Examples are high viscosity methylcellulose, high viscosity sodium carboxymethylcellulose, sodium or ammonium alginate, amongst others.

In the event low viscosities can be tolerated, the amount of protective colloid may be reduced in the binder emulsion and color concentrate, whereby laundering resistance increases.

There are two difficulties in the way of popularizing pigment padding. One is crocking. The binder emulsions, as formulated above, sow very low crocking and can be considered as practically non-crocking for many purposes, thereby eliminating this drawback of pigment padding. The second difficulty is represented by the phenomenon called pigment migration. During the drying operation the pigments migrate towards the heat and cause streaks and uneven color effects. If the drying tunnels or chambers show the slightest differences in spots with regard to temperature, pigment migration will take place. It is very difficult even with the most modern equipment to have uniform temperatures all over the drying chambers. The emulsion aggregated (emulsion polymerized) binders are solidified in the emulsion and therefore prevent the migration of the pigments. This particular performance of these new emulsions permits their use with great advantage in pigment padding to produce solid color effects by pigments.

EXAMPLE 17—CROCK REDUCING AGENTS

In the above examples neoprene latex was used as crock reducing agent. I found that satisfactory crock reduction is obtained with the use of neoprene cements (solvent solutions), polystyrene emulsions, Vistanex (linear polymer of isobutylene), vinyl chloride polymers, acrylonitrile copolymers and mixtures of the last two mentioned polymers. In the color concentrates I may use from 0.1% to 2% crock reducing agent solids. In many instances increase in the concentrated resin emulsion content may eliminate the necessity of using a special crock reducing agent. The concentrated resin binder emulsion may be increased, for example, to about 62% by weight based upon the total composition.

EXAMPLE 18—WHITE COLOR CONCENTRATE

A pigmented white color concentrate is made by preparing a 70% pigment content titanium dioxide water dispersion, by adding 18% Duponol Me and 2% Nekal A (propylated naphthalene sulfonate) based on the pigment content. The dispersion contains 70% titanium dioxide, 14% wetting agents, and 16% water. The color concentrate is prepared by taking 59 parts of the resin emulsion of Example 7, 2.9 parts of neoprene latex 601, and 38.1 parts of said white pigment slurry (dispersion). This color concentrate may be used to print white on loosely woven fabrics, on light dyed fabrics, or with a discharge extender cutback emulsion as discharge white on predyed background. A 1:2 cut is a satisfactory dilution. This white pigment concentrate when added in small proportion to other colors, will increase their hiding power and enable colored printing effects on light or medium light predyed backgrounds, without discharge.

The color concentrates of this invention, as illustrated by Examples 5, 15, 17 and 18, form textile printing color compositions in admixture with extender print paste emulsions.

For each volume part of color concentrate from about 1 volume part to about 200 volume parts of extender print paste emulsion may be used in the admixture. These extender print paste emulsions are illustrated by Examples 10 to 13 and preferably comprise 47.5 to 56% water, 0.3 to 0.8% of high viscosity water soluble cellulose ether and 43% to 51.5% of a water immiscible hydrocarbon solvent, said percents of the extender print paste emulsions being expressed on weight basis.

What is claimed is:

1. The process of preparing an oil-in-water resin emulsion textile decorating pigment color composition which comprises preparing as a first component an aqueous resin emulsion containing an ester of a polyunsaturated fatty acid with a synthetic alcohol formed by the condensation of epichlorohydrin and bisphenol as a resin binder, an emulsifying agent selected from the class consisting of soaps of fatty acids, fatty acid esters of polyethylene glycols, quaternary ammonium salts, fatty alcohol sulfates, polyethylene oxide condensation products, polymerized glycol esters and sodium salts of organic sulfonates, and a protective colloid, selected from the class consisting of casein, ammonium caseinate, methylcellulose, sodium carboxymethylcellulose, gum tragacanth, dextrin, starch, sodium polyacrylate, sodium polymethacrylate, water-soluble and alkali-soluble hydroxyethylcellulose, locust bean gum, water-soluble salts of the maleic adduct of styrene, and alginates, preparing as a separate second component an aqueous pigment dispersion containing a pigment which is in the in-water deflocculated state and which is a member of the class consisting of phthalocyanine pigments, insoluble azo pigments, vat pigments, carbon blacks and titanium dioxide, the particles of said pigment in said separate component being surrounded by water having dissolved therein a water-soluble fatty alcohol sulfate as a pigment-dispersing agent, said fatty alcohol sulfate having at least 12 carbon atoms in the molecule and being present in the said separate component in proportions of at least about 10% of the weight of the pigment, and combining said emulsion and said separate component to form a viscous pigment color composition suitable as a color concentrate, which is dilutable with clear extender print paste emulsions to form the desired strength of shade when used for textile printing, said pigment color composition having, based on the total weight of said pigment color composition, between about 4.5% and about 31% of said resin binder, between about 0.18% and about 2.16% of said emulsifying agent, between about 0.075% and about 4.34% of said protective colloid, said resin binder, emulsifying agent and protective colloid all being derived from said first resin emulsion component, and between about 7% and about 22% of said pigment derived from said separate second component.

2. An oil-in-water resin emulsion textile decorating pigment color composition prepared by the process of claim 1.

3. The composition of claim 2, in which the resin binder non-volatile content comprises from about 10% to about 20% of an organic solvent soluble amine-formaldehyde resin.

4. The composition of claim 2, in which the resin binder non-volatile content comprises from about 10% to about 20% of an organic solvent soluble melamine formaldehyde resin.

5. The composition of claim 2, in which the resin binder non-volatile content comprises from about 10% to about 20% of an organic solvent soluble urea formaldehyde resin.

6. The composition of claim 2, containing in addition organic volatile hydrocarbon solvents in the dispersed phase of the emulsion.

7. An oil-in-water resin emulsion textile printing color composition consisting of 1 part by volume of the color composition of claim 2 and from about 1 part to about 200 parts by volume of a clear extender print paste emulsion, said extender print paste emulsion comprising 47½% to 56% water, 0.3% to 0.8% of high viscosity water soluble cellulose ether and 43% to 51½% of a water immiscible hydrocarbon solvent, all percents being by weight.

8. The composition of claim 2, in which the emulsifying agent is a lauryl alcohol sulfate.

9. The composition of claim 2 in which the pigment-dispersing agent is in the proportion of about 18 parts by weight of fatty alcohol sulfate and of about 2 parts by weight of alkyl naphthalene sulfonate for each 100 parts by weight of dry pigment.

10. The composition of claim 2, in which the second component contains additionally a protective colloid.

11. The process of preparing an oil-in-water resin emulsion textile decorating pigment color composition which comprises preparing as a first component an aqueous resin emulsion containing an ester of a polyunsaturated fatty acid with a synthetic alcohol formed by the condensation of epichlorhydrin and bisphenol as a resin binder, an emulsifying agent selected from the class consisting of soaps of fatty acids, fatty acid esters of polyethylene glycols, quaternary ammonium salts, fatty alcohol sulfates, polyethylene oxide condensation products, polymerized glycol esters and sodium salts of organic sulfonates, and a protective colloid, selected from the class consisting of casein, ammonium caseinate, methylcellulose, sodium carboxymethylcellulose, gum tragacanth, dextrin, starch, sodium polyacrylate, sodium polymethacrylate, water-soluble and alkali-soluble hydroxyethylcellulose, locust bean gum, water-soluble salts of the maleic adduct of styrene, and alginates, the vehicle solids of the emulsion being sensitive to the action of the air when exposed to air in a thin layer of a wet film thickness of 0.0015" to 0.003" and forming a coherent solid film immediately upon demulsification of the emulsion, said solid film formation being reached within a period ranging from a couple of seconds to one hour, the solid polyhydric alcohol esters in the dispersed phase of the emulsion having an oxygen content not exceeding the oxygen content of the unemulsified polyhydric alcohol esters by more than 2.8%, preparing as a separate second component an aqueous pigment dispersion containing a pigment which is in the in-water deflocculated state and which is a member of the class consisting of phthalocyanine pigments, insoluble azo pigments, vat pigments, carbon blacks and titanium dioxide, the particles of said pigment in said separate component being surrounded by water having dissolved therein a water-soluble fatty alcohol sulfate as a pigment-dispersing agent, said fatty alcohol sulfate having at least 12 carbon atoms in the molecule and being present in the said separate component in proportions of at least about 10% of the weight of the pigment, and combining said emulsion and said separate component to form a viscous pigment color composition suitable as a color concentrate, which is dilutable with clear extender print paste emulsions to form the desired strength of shade when used for textile printing, said pigment color composition having, based on the total weight of said pigment color composition, between about 4.5% and about 31% of said resin binder, between about 0.18% and about 2.16% of said emulsifying agent, between about 0.075% and about 4.34% of said protective colloid, said resin binder, emulsifying agent and protective colloid all being derived from said first resin emulsion component, and between about 7% and about 22% of said pigment derived from said separate second component.

12. An oil-in-water resin emulsion textile decorating pigment color composition prepared by the process of claim 11.

13. A pigment free oil-in-water emulsion coating material useful as the first component in claim 12 in which the dispersed phase incorporates a resin which is an ester of an unsaturated fatty acid with a synthetic alcohol formed by the condensation of epichlorhydrin and bis-phenol, said ester being in a solid state in the water emulsion, the vehicle solids of the emulsion being sensitive to the action of the air, when exposed to it in a thin layer of a wet film thickness of 0.0015" to 0.003", forming a coherent solid film immediately upon demulsification of the emulsion, said solid film formation being reached within a period ranging from a couple of seconds to one hour, the vehicle solids dispersed phase content ranging from 10% to 70%, based on the total weight of water and vehicle solids constituents of the emulsion surface coating material, said emulsion surface coating material comprising further an emulsifying agent selected from the class consisting of soaps of fatty acids, fatty acid esters of polyethylene glycols, quaternary ammonium salts, fatty alcohol sulfates, polyethyleneoxide condensation products, polymerized glycol esters and sodium salts of organic sulfonates in a proportion between about 0.2% and about 4.2% on said oil-in-water emulsion, and a protective colloid selected from the class consisting of casein, ammonium caseinate, methylcellulose, sodium carboxymethylcellulose, gum tragacanth, dextrin, starch, sodium-polyacrylate, sodium-polymethacrylate, water-soluble salts of the maleic adduct of styrene and alginates in a proportion between about 0.25% and about 7% based on said oil-in-water emulsion.

14. The composition of claim 12, in which the protective colloid is methylcellulose.

15. The composition of claim 12, in which the protective colloid is casein.

References Cited in the file of this patent

UNITED STATES PATENTS

| | | |
|---|---|---|
| 2,637,621 | Auer | May 5, 1953 |
| 2,681,322 | Auer | June 15, 1954 |